US 7,840,738 B2

(12) United States Patent
Boer et al.

(10) Patent No.: US 7,840,738 B2
(45) Date of Patent: Nov. 23, 2010

(54) CONNECTOR SYSTEM

(75) Inventors: Rodney P. Boer, Hatboro, PA (US); Kevin P. Bonner, Langhorne, PA (US); Kevin M. Palamar, Coatesville, PA (US)

(73) Assignee: Honeywell International Inc., Morristown, NJ (US)

( * ) Notice: Subject to any disclaimer, the term of this patent is extended or adjusted under 35 U.S.C. 154(b) by 756 days.

(21) Appl. No.: 11/545,384

(22) Filed: Oct. 10, 2006

(65) Prior Publication Data

US 2008/0086581 A1   Apr. 10, 2008

(51) Int. Cl.
*G06F 13/00* (2006.01)
(52) U.S. Cl. .................. 710/302; 710/100; 710/305; 710/304; 361/685; 439/60
(58) Field of Classification Search ......... 710/301–306, 710/100; 361/685; 439/60
See application file for complete search history.

(56) References Cited

U.S. PATENT DOCUMENTS

| | | | |
|---|---|---|---|
| 4,454,552 A | 6/1984 | Barnes et al. | |
| 4,835,737 A | 5/1989 | Herrig et al. | |
| 5,023,754 A | 6/1991 | Aug et al. | |
| 5,077,675 A | 12/1991 | Tam | |
| 5,213,514 A | 5/1993 | Arai | |
| 5,272,584 A | 12/1993 | Austruy et al. | |
| 6,232,676 B1 | 5/2001 | Kozyra et al. | |
| 6,286,066 B1 * | 9/2001 | Hayes et al. | 710/302 |
| 6,288,911 B1 | 9/2001 | Aoki et al. | |
| 6,296,491 B1 | 10/2001 | Pickles | |
| 6,355,991 B1 | 3/2002 | Goff et al. | |
| 6,421,252 B1 | 7/2002 | White et al. | |
| 6,437,992 B1 | 8/2002 | Carney et al. | |
| 6,461,173 B1 | 10/2002 | Mizuno et al. | |
| 6,905,370 B2 | 6/2005 | Blackwell | |
| 2005/0068754 A1 | 3/2005 | Corrado et al. | |
| 2005/0193159 A1 * | 9/2005 | Ng et al. | 710/302 |

* cited by examiner

*Primary Examiner*—Ryan M Stiglic
*Assistant Examiner*—Kim T Huynh
(74) *Attorney, Agent, or Firm*—Munck Carter, LLP

(57) ABSTRACT

Devices, systems and methods for providing a connector system are disclosed. The exemplary device may have system and device flow contacts on the system and device connectors, respectively. A first set contacts and a second set of contacts may be electrically connected to each other to verify that system and device contacts are properly mated to each other. A controller linked to a contact circuit may regulate the power and/or signals provided to an end device.

21 Claims, 5 Drawing Sheets

Couple system and device connectors such that device verification contact and system verification contact are coupled to each other
302

Power is supplied to device verification contact from the system verification contact and first device contact becomes energized via Trace A
304

Couple first device contact to first system contact
306

Power is supplied to first system contact and second system contact becomes energized via Trace B
308

Couple second system contact to second device contact
310

Power is supplied second device contact via second system contact and to controller via Trace C
312

Controller regulates power to device
314

```
┌─────────────────────────────────────┐
│   Couple system and device          │
│   connectors such that device       │
│  verification contact and system    │
│  verification contact are coupled   │
│           to each other             │
│                402                  │
└─────────────────────────────────────┘
                  ▼
┌─────────────────────────────────────┐
│  Couple a first device contact to   │
│        first system contact         │
│                404                  │
└─────────────────────────────────────┘
                  ▼
┌─────────────────────────────────────┐
│   Couple second system contact to   │
│       second device contact         │
│                406                  │
└─────────────────────────────────────┘
                  ▼
┌─────────────────────────────────────┐
│  Complete a circuit that verifies   │
│   device verification contact and   │
│   system verification contact are   │
│   coupled to each other, that a     │
│    first device contact to first    │
│  system contact are coupled to each │
│   other, and that a second system   │
│   contact to second device contact  │
│       are coupled to each other     │
│                408                  │
└─────────────────────────────────────┘
```

```
┌─────────────────────────────────────┐
│  Decouple device connector and      │
│        system connector             │
│                502                  │
└─────────────────────────────────────┘
                  │
                  ▼
┌─────────────────────────────────────┐
│  Either first system contact and    │
│  first device contact are first to  │
│  be physically decoupled or second  │
│  system contact and second device   │
│  contact are first to be physically │
│             decoupled               │
│                504                  │
└─────────────────────────────────────┘
                  │
                  ▼
┌─────────────────────────────────────┐
│  Controller 118 determines that     │
│    system contacts have become      │
│   decoupled to device contacts and  │
│   controller 118 disconnects power  │
│            from device              │
│                506                  │
└─────────────────────────────────────┘
```

CONNECTOR SYSTEM

FIELD OF THE INVENTION

The present invention relates generally to connector systems, and more particularly to a hot-swappable connector system.

BACKGROUND OF THE INVENTION

Many electronic devices are required to be hot-replaceable, a feature also referred to as hot-swappable or hot-pluggable. A hot-replaceable device may be used to support being swapped without first removing power or a critical line to devices in which they reside. Hot-replaceable devices are typically used in modular-computer-systems, for example, where modules are plugged into card-files that contain backplanes.

In such modular-computer-systems, the modules slide into slots of a card-file, where each slot is outfitted with a card-guide. The card-guide plays an important role in the hop-swap circuitry and is typically a necessary feature. Specifically, the card-guide ensures that a module is always properly aligned to a backplane before the electrical connector engages. These illustrative modular-computer-systems typically have modules that have multiple pins with one of the pins, a "short-pin", being shorter in length relative to the other pins. The short-pin will be the last pin in such illustrative systems to make an electrical connection and the first pin to break the electrical connection when properly aligned by a card-guide.

This use of card-guides may add additional components and cost to a device. In addition, the use of card-guides to ensure proper alignment may limit the location and ability to connect a device to a particular system.

Accordingly, what is needed are efficient and effective systems and methods for ensuring proper alignment of a connector system (e.g., electrical, signal, etc.) without the use of card-guides. In addition, systems and methods are needed to provide a more versatile connector system for hot-replaceable devices.

SUMMARY OF THE INVENTION

It is, therefore, an objective of the present invention to provide devices, systems, and methods for a hot-replaceable connector system. According to an exemplary embodiment, a flow contact on a device connector may mate to a flow contact on a system connector. A first device contact on a device connector may mate to a first system contact on the system connector, and a second device contact on the device connector opposite the first side may mate to a second system contact on the system connector after the act of connecting the system and device flow contacts. An open circuit exists between the device connector and the system connector until 1) the system and device flow contacts are mated; 2) the first device contact is mated to the first system contact; 3) the second device contact is mated to the second system contact; and 4) optionally a controller senses a closed electrical circuit and allows electrical power to be provided to an end device.

In another exemplary embodiment, either the device first contact and second contact or the system first contact and second contact are pins (the other set of contacts being sockets) and are shorter than the flow contact (either the system or the device flow contact). In some exemplary embodiments the system flow contact may supply power to the connector system, which may provide power to a controller via connections between first and second system and device contacts. In some exemplary embodiments the system flow contact may supply one or more signals to the connector system, which may provide one or more signals to a controller via connections between first and second system and device contacts. The connector system may be a connector system for a hot-swappable module or other device and may need to determine a proper connection.

BRIEF DESCRIPTION OF THE DRAWINGS

The above and other objectives and advantages of the present invention will be apparent upon consideration of the following detailed description, taken in conjunction with the accompanying drawings, in which like reference numbers refer to like parts throughout, and in which:

FIG. 3 is a flow chart illustrating an exemplary first connection method of the present invention.

FIG. 4 is a flow chart illustrating an exemplary second connection method of the present invention.

FIG. 5 is a flow chart illustrating an exemplary disconnection method of the present invention.

DETAILED DESCRIPTION OF THE INVENTION

Figure 1:
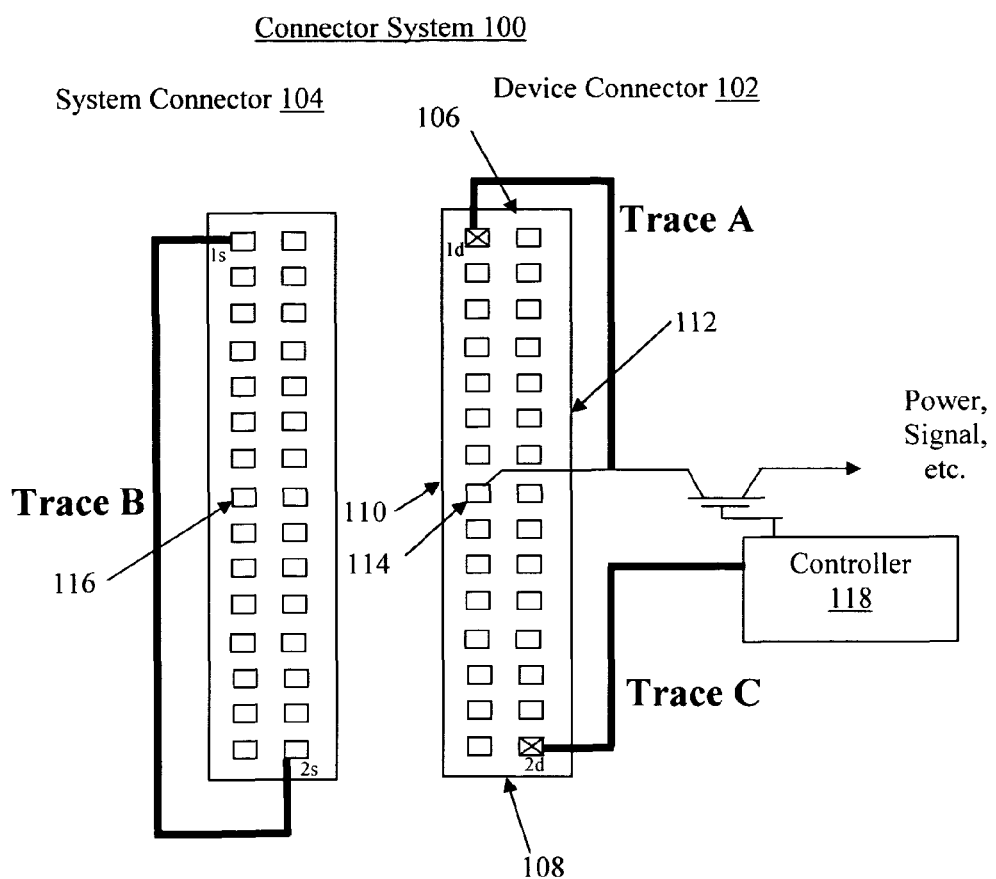
FIG. 1 is a generalized schematic of an exemplary connector system according to an exemplary embodiment of the present invention.

In FIG. 1, Connector system 100 is a two-part connection with circuitry. Connector system 100 allows a hot-replaceable device to be connected to and disconnected from a system without the need for or the limitations of card-guides or any other extraneous alignment system or device. As illustrative examples, connector system 100 may be a card/backplane arrangement, a cable connection arrangement, or any other arrangement suitable for establishing a connection (e.g., electrical, signal, etc.) between two devices. Connector system 100 provides for systems and methods for establishing proper alignment of electrical contacts to ensure that the necessary and correct connections have been established and verified prior to the application of power/signal to a connected device. It should be noted that the application of power is being used to describe the invention disclosed herein, however, those skilled in the art will appreciate that the application of power or any signal (e.g., analog, digital, electrical, optical, etc.) is expressly contemplated and within the scope of this invention.

Referring to FIG. 1, connector system 100 may include device connector 102 and system connector 104. The device contacts on device connector 102 may be mated to the system contacts on system connector 104. Signal and/or power may be supplied to device connector 102 when system contacts $1_s$ and $2_s$ are mated to device contacts $1_d$ and $2_d$. Connector system 100 illustrated in the exemplary embodiment shown in FIG. 1, displays thirty-contacts on device connector 102 and system connector 104; however, the invention is not limited to thirty-contacts on each connector system and any other suitable number or orientation of contacts on each connector may be used to practice the invention.

According to an illustrative preferred embodiment of the present invention, device connector 102 has a first portion 106 located on the side from which contact $1_d$ is located. Device connector 102 also has a second portion 108 opposite the first portion 106 from which contact $2_d$ is located. Device connector 102 also has a front portion 110 and a rear portion 112. Contact $1_d$ may be located at front portion 110 and contact $2_d$ may be located at rear portion 112. Accordingly, in FIG. 1, contacts $1_d$ and $2_d$ are located diagonally from each other.

Moreover, according to the exemplary embodiment of FIG. 1, the contacts located on device connector 102 may be pins and the contacts located on system connector 104 may be sockets. It should be noted that the use of pins and sockets to describe the contacts located on device 102 and system 104 are merely for the purpose of illustration rather than limitation and that those skilled in the art will appreciate that the use of other types of contacts such as tabs and slots or any other suitable types of contacts may be used and are expressly contemplated and within the scope of this invention. In operation, if pins and sockets are used as the contacts located on device connector 102 and system connector 104, then contact $1_d$ and contact $2_d$ may be pins that are shorter than any other pins on device connector 102.

As shown in FIG. 1, connector system 100 may also include device flow contact 114 and system flow contacts 116. Device flow contact 114 may be one contact or a plurality of contacts located on device connector 102. System flow contact 116 may be one contact or a plurality of contacts located on system connector 104. However, for the purpose of illustration, only one device flow contact and one system flow contact are shown in FIG. 1. Device flow contact 114 and system flow contact 116 may be located in corresponding positions on device connector 102 and system connector 104, respectively. For the purpose of illustration device flow contact 114 and system flow contact 116 may be located in proximity to the mid-section of device connector 102 and system connector 104, respectively. Nevertheless, it should be noted that device flow contact 114 and system flow contact 116 may be located in any locations on device connector 102 and system connector 104.

In operation, system flow contact 116 may be in a constantly energized state (i.e., electrical power being applied, such as 24 VDC, 120 VAC, etc.). It should be noted that the use of electrical power being applied to system flow contact 116 is merely for the purpose of illustration rather than limitation and that those skilled in the art will appreciate that the use of signals (e.g., analog, digital, optical, etc.) or different types of power may be used and are expressly contemplated and within the scope of this invention.

Figure 2:
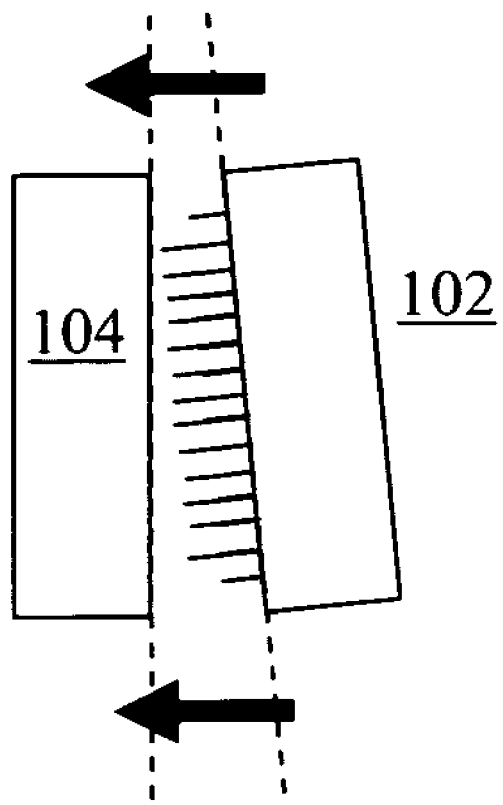
FIG. 2 is a generalized physical illustration showing a first connector system of an exemplary embodiment of the present invention.

According to the exemplary embodiment shown in FIG. 2, system connector 104 and device connector 102 mate with each other. During this mating, system flow contact 116 mates with device flow contact 114. As shown in FIG. 1, power (or any other suitable signal, as described above) may then be applied from system flow contact 116 to device flow contact 114.

As described above, once system flow contact 116 and device flow contact 114 are mated to each other, power is then supplied to device flow contact 114. However, as illustratively shown in FIG. 1, due to a verification circuit, defined partially by Trace A, Trace B, Trace C, and controller 118, power is prevented from being immediately supplied to an end device. In operation, the power supplied to device flow contact 114 allows current to flow through Trace A and energizes contact $1_d$. When contact $1_d$ is energized and contact $1_d$ and contact $1_s$ are mated, contact $1_s$ may become energized and current may then be transferred along Trace B to contact $2_s$. When contact $2_s$ is energized and mated to contact $2_d$, current may then be supplied to controller 118 through Trace C. Controller 118 may then selectively supply power to an end device once energized. In other words, until contacts $1_s$ and $1_d$ and contacts $2_s$ and $2_d$ are physically touching each other and verified through the circuit, shown in FIG. 1. as defined by Trace A, Trace B, and Trace C, controller 118 is prevented from being energized and supplying power to an end device.

As described in the illustrative embodiments above, device contacts $1_d$ and $2_d$ may be pins and system contacts ($1_s$ and $2_s$) may be sockets. If pins and sockets are the desired form of contacts to be used to practice the invention described herein, then the pins used may vary in length relative to other pins located on device connector 102. The variation in length of device pins ($1_d$ and $2_d$) may be relative to device flow pin 114. For example, if the device pins $1_d$ and $2_d$ are shorter than other pins located on device connector 102 and the device pins $1_d$ and $2_d$ are mated to system sockets ($1_s$ and $2_s$) then the geometry may require that the device flow pin 114 is securely connected to system flow socket 116. The invention is not limited to the device flow pin 114 being longer than other device pins. For example, device pins $1_d$ and $2_d$ may be the same length as device flow pin 114 but may have a larger or smaller diameter, as appropriate, in order to provide the same effects as are described above with shorter pins.

The system detects the contact closure of contacts $1_d$ and $2_d$ with contacts $1_s$ and $2_s$ via Trace A, Trace B, and Trace C, such that the circuit will not become energized unless contacts $1_d$ and $1_s$ and contacts $2_s$ and $2_d$ are connected to each other. The dimensions of the contacts and/or distance apart (pitch) may be designed based on the length and width of the connector system 100. The dimensions of the contacts may also be designed based on the intended use. For example, the distance of a possible arc of electricity by an energized contact may be used to determine the dimensions of the contacts. In addition, the system may only rely on device and system connector geometry for angular guidance, due to the fact that the possible angles to be encountered are controlled by the actual mating of the connectors alone.

Referring to FIG. 3, method 300 illustrates an exemplary embodiment of the present invention. Device flow contact 114 on device connector 102 mates to system flow contact 116 on the system connector 104 as connectors 102 and 104 are pressed together (block 302). Power is supplied to device flow contact 114 and first device contact $1_d$ becomes energized via Trace A (block 304). First device contact $1_d$ is mated to first system contact $1_s$ (block 306). Power is supplied to first system contact $1_s$ and second system contact $2_s$ becomes energized via Trace B (block 308). If the second system contact $2_s$ has not already been mated to the second device contact, as the connectors 102 and 104 are pressed together, the second system contact $2_s$ mates to the second device contact $2_d$ (block 310). Power is supplied to the second device contact $2_d$ and controller 118 becomes energized via Trace C (block 312). Controller 118 regulates power to the device (block 314). As mentioned above, the use of electrical power shown in FIG. 3 is merely for the purpose of illustration rather than limitation, and those skilled in the art will appreciate that the use of signals (e.g., analog, digital, optical, etc.) or different types of power may be used and are expressly contemplated and within the scope of this invention.

Referring to FIG. 4, a connection method 400 illustrates an exemplary embodiment of the present invention. System connector 104 and device connector 102 are mated together such that such that device flow contact 114 and system flow contact 116 are mated to each other (block 402). Occurrence of the next action depends on the angle of device connector 102 relative to system connector 104. If the first portion 106 or front portion 110 is located closer to first system contact $1_s$, then first device contact $1_d$ mates to first system contact $1_s$ (block 404). If the second portion 108 or rear portion 112 is located closer to second system contact $2_s$, then second device contact $2_d$ mates to second system contact $2_s$ (block 406). After steps 404 and 406 are completed, regardless of the order in which they occur, a circuit is completed and the correct completion of the circuit verifies that system connector 102 and device connector 104 are properly mated to each other (block 408). Again, as described above, the embodiments described herein are not limited to electrical power and are merely for the purpose of illustration rather than limitation, and those skilled in the art will appreciate that the use of signals (e.g., analog, digital, optical, etc.) or different types of power may be used and are expressly contemplated and within the scope of this invention. In addition, the systems, devices, and methods described herein are not limited to the testing (i.e., completion of a circuit) described herein to determine if system connector 104 and device connector 102 are properly mated. For example, controller 118 may test for a reference point located within the circuit for a voltage value or any other suitable value in order to determine whether system connector 104 and device connector 102 are properly mated.

Referring to FIG. 5, a disconnection method 500 illustrates an exemplary embodiment of the present invention. Device connector 102 and system connector 104 are pulled apart from each other (block 504). Either first system contact $1_s$ and first device contact $1_d$ are first to be physically unmated or second system contact $2_s$ and second device contact $2_d$ are first to be physically unmated (block 506). When it is determined by controller 118 that either first system contact $1_s$ and first device contact $1_d$ or second system contact $2_s$ and second device contact $2_d$ have become unmated, controller 118 disconnects power from device (block 506).

Persons skilled in the art will appreciate that the present invention can be practiced by other than the described examples and embodiments, which are presented for purposes of illustration rather than of limitation and that the present invention is limited only by the claims that follow.

What is claimed is:

1. A connector system, comprising:
a first system contact located on a first side of a system connector and a second system contact located on a second side of the system connector;
a first device contact located on a first side of a device connector and a second device contact located on a second side of the device connector;
a device flow contact located on the device connector that is configured to be electrically mated to a system flow contact located on the system connector; and
a controller configured to verify whether a specified electrical path has been established, the specified electrical path comprising a path from the system flow contact to the device flow contact, from the device flow contact to the first device contact, from the first device contact to the first system contact, from the first system contact to the second system contact, and from the second system contact to the second device contact.

2. The connector system of claim 1, wherein the first system contact and the second system contact are shorter than at least one of the flow contacts.

3. The connector system of claim 1, further comprising:
a transistor coupled to the device flow contact and having a gate coupled to the controller.

4. The connector system of claim 3, wherein the controller is configured to receive a current through the second device contact when the specified electrical path has been established.

5. The connector system of claim 4, wherein the controller is configured to cause power to be supplied to an end device through the transistor in response to receiving the current.

6. The connector system of claim 1, wherein the connector system comprises a coupling for a hot-swappable module.

7. The connector system of claim 1, wherein the first system contact is on a front portion of the system connector and the second system contact is on a back portion of the system connector.

8. A method comprising:
connecting a device flow contact on a device connector to a system flow contact on a system connector;
connecting a first device contact on a first side of the device connector to a first system contact on the system connector;
connecting a second device contact on a second side of the device connector opposite the first side to a second system contact on the system connector; and
providing power to an end device when a specified electrical path is established, the specified electrical path comprising a path from the system flow contact to the device flow contact, from the device flow contact to the first device contact, from the first device contact to the first system contact, from the first system contact to the second system contact, and from the second system contact to the second device contact.

9. The method of claim 8, wherein the first system contact and the second system contact are shorter than at least one of the flow contacts.

10. The method of claim 8, further comprising:
providing power from the device flow contact to a transistor.

11. The method of claim 10, further comprising:
providing a signal to a gate of the transistor when the specified electrical path is established.

12. The method of claim 11, wherein providing power to the end device comprises providing power from the transistor to the end device in response to the signal provided to the gate of the transistor.

13. The method of claim 8, wherein the system and device connectors comprise a coupling for a hot-swappable module.

14. The method of claim 8, wherein the first device contact is on a front portion of the device connector and the second device contact is on a back portion of the device connector.

15. A method comprising:
disconnecting a first device contact on a first side of a device connector from a first system contact on a system connector;
disconnecting a second device contact on a second side of the device connector opposite the first side from a second system contact on the system connector;
disconnecting a device flow contact on the device connector from a system flow contact on the system connector; and
stopping a supply of power to an end device when a specified electrical path is broken, the specified electrical path comprising a path from the system flow contact to the device flow contact, from the device flow contact to the first device contact, from the first device contact to the first system contact, from the first system contact to the second system contact, and from the second system contact to the second device contact.

16. The method of claim 15, wherein the first system contact and the second system contact are shorter than at least one of the flow contacts.

17. The method of claim 15, wherein the power is supplied to the end device through a transistor.

18. The method of claim 17, wherein stopping the supply of power to the end device comprises providing a signal to a gate of the transistor, the signal causing the transistor to stop the supply of power to the end device.

19. The method of claim 15, further comprising:

detecting the specified electrical path breaking by sensing a loss of current received through the specified electrical path.

20. The method of claim 15, wherein the first device contact is on a front portion of the device connector and the second device contact is on a back portion of the device connector.

21. An apparatus, comprising:

a device connector configured to be coupled to a system connector, the device connector comprising:

a first device contact located on a first side of the device connector, the first device contact configured to be coupled to a first system contact on the system connector;

a second device contact located on a second side of the device connector opposite the first side, the second device contact configured to be coupled to a second system contact on the system connector; and a device flow contact configured to be coupled to a system flow contact on the system connector; and a controller configured to determine whether a specified electrical path has been established and to cause power to be supplied to an end device in response to determining that the specified electrical path has been established, the specified electrical path comprising a path from the system flow contact to the device flow contact, from the device flow contact to the first device contact, from the first device contact to the first system contact, from the first system contact to the second system contact, and from the second system contact to the second device contact.

* * * * *